US011891838B2

(12) United States Patent
Lang

(10) Patent No.: US 11,891,838 B2
(45) Date of Patent: Feb. 6, 2024

(54) DOOR LOCK FOR A DOMESTIC ELECTRICAL APPLIANCE

(71) Applicant: emz-Hanauer GmbH & Co. KGaA, Nabburg (DE)

(72) Inventor: Markus Lang, Neunburg vorm Wald (DE)

(73) Assignee: EMZ-HANAUER GMBH & CO. KGAA, Nabburg (DE)

( * ) Notice: Subject to any disclaimer, the term of this patent is extended or adjusted under 35 U.S.C. 154(b) by 512 days.

(21) Appl. No.: 16/868,585

(22) Filed: May 7, 2020

(65) Prior Publication Data

US 2020/0355000 A1 Nov. 12, 2020

Related U.S. Application Data

(60) Provisional application No. 62/845,929, filed on May 10, 2019.

(30) Foreign Application Priority Data

Nov. 29, 2019 (DE) ..................... 10 2019 008 338.5

(51) Int. Cl.
*E05B 47/00* (2006.01)
*E05B 9/02* (2006.01)
(Continued)

(52) U.S. Cl.
CPC .............. *E05B 63/185* (2013.01); *E05B 9/02* (2013.01); *E05B 17/2007* (2013.01);
(Continued)

(58) Field of Classification Search
CPC .... E05B 9/02; E05B 47/0001; E05B 47/0002; E05B 47/0003; E05B 47/0004;
(Continued)

(56) References Cited

U.S. PATENT DOCUMENTS 780,192 A 1/1905 Jones
2,772,106 A 11/1956 Semelka
(Continued)

FOREIGN PATENT DOCUMENTS

CN 101666028 A 3/2010
CN 107227586 A * 10/2017
(Continued)

OTHER PUBLICATIONS

DE Office Action in co-pending application DE 10 2019 008 338.5, dated May 20, 2021.

*Primary Examiner* — Christine M Mills
*Assistant Examiner* — Peter H Watson
(74) *Attorney, Agent, or Firm* — Hayes Soloway PC

(57) ABSTRACT

A door lock for a domestic electrical appliance such as, for example, a washing machine of the top loader type includes a lock module, a housing shell for the floating mounting of the lock module on a housing wall portion of a body of the domestic appliance, a locking member which is arranged to be movable between an unlocking position and a locking position, and an electrically controllable actuator for actuating the locking member. The lock module has an insertion opening for insertion of a closing element on closing of the door of the domestic appliance. The locking member in its unlocking position allows the closing element to move out of the insertion opening and in the locking position effects blocking of the closing element against moving out of the insertion opening. At least one centring slope for the closing element is formed at the insertion opening.

11 Claims, 6 Drawing Sheets

(51) Int. Cl.

| | |
|---|---|
| ***E05B 63/00*** | (2006.01) |
| ***D06F 39/14*** | (2006.01) |
| ***E05B 63/18*** | (2006.01) |
| ***E05B 17/22*** | (2006.01) |
| ***E05B 47/06*** | (2006.01) |
| ***E05B 17/20*** | (2006.01) |
| ***E05C 19/00*** | (2006.01) |
| *D06F 58/20* | (2006.01) |

(52) U.S. Cl.
CPC .......... *E05B 17/22* (2013.01); *E05B 47/0001* (2013.01); *E05B 47/0004* (2013.01); *E05B 47/0046* (2013.01); *E05B 47/0603* (2013.01); *E05B 63/0056* (2013.01); *E05C 19/009* (2013.01); *D06F 39/14* (2013.01); *D06F 58/20* (2013.01); *E05B 2047/0068* (2013.01); *E05B 2047/0069* (2013.01); *E05B 2047/0092* (2013.01); *E05Y 2900/312* (2013.01)

(58) Field of Classification Search
CPC ............. E05B 47/0046; E05B 47/0696; E05B 47/0603; E05B 63/0056; D06F 39/14; D06F 37/42; D06F 34/20; A47L 15/4259; Y10T 292/1021; Y10T 292/696; Y10T 292/699; Y10T 292/705; Y10T 292/707; Y10S 292/69; Y10S 292/53; Y10S 292/54; Y10S 292/55; Y10S 292/60
See application file for complete search history.

(56) References Cited

U.S. PATENT DOCUMENTS

| | | | | |
|---|---|---|---|---|
| 2,837,361 | A | 6/1958 | Loeb | |
| 2,857,191 | A | 10/1958 | Buchholtz | |
| 3,260,813 | A | 7/1966 | Dargene | |
| 3,765,194 | A | 10/1973 | Moore | |
| 4,351,288 | A | 9/1982 | Gasloli | |
| 4,907,831 | A | 3/1990 | Di Giusto | |
| 5,062,668 | A | 11/1991 | Onderka et al. | |
| 5,176,417 | A | 1/1993 | Bauer | |
| 5,419,305 | A | 5/1995 | Hanley | |
| 5,494,325 | A | 2/1996 | Liu et al. | |
| 5,997,056 | A | 12/1999 | Yamagishi | |
| 6,155,616 | A | 12/2000 | Akright | |
| 6,279,972 | B1 | 8/2001 | Brill et al. | |
| 6,290,270 | B1 | 9/2001 | Spiessl | |
| 6,390,518 | B1 | 5/2002 | Elick | |
| 6,739,633 | B2 | 5/2004 | Holloway et al. | |
| 6,913,296 | B2 | 7/2005 | Bassi | |
| 7,032,939 | B2 | 4/2006 | Magnusson | |
| 7,210,711 | B2 | 5/2007 | Dirnberger et al. | |
| 7,299,666 | B2 | 11/2007 | Geyer et al. | |
| 7,299,809 | B2 | 11/2007 | Kang | |
| 8,736,406 | B2 | 5/2014 | Hapke et al. | |
| 8,991,877 | B2 | 3/2015 | Spiessl | |
| 2002/0056997 | A1 | 5/2002 | Bassi | |
| 2003/0160461 | A1 | 8/2003 | Promutico | |
| 2005/0194795 | A1 | 9/2005 | Hapke et al. | |
| 2006/0101869 | A1 | 5/2006 | Osvatic | |
| 2008/0042447 | A1 | 2/2008 | Neumann | |
| 2011/0057460 | A1 | 3/2011 | Onofrio | |
| 2016/0138809 | A1 | 5/2016 | Colucci et al. | |
| 2016/0251881 | A1 | 9/2016 | Dirnberger et al. | |
| 2018/0000312 | A1 * | 1/2018 | Dirnberger | E05C 19/02 |
| 2018/0371800 | A1 * | 12/2018 | McDonald | E05B 47/0046 |

FOREIGN PATENT DOCUMENTS

| | | | | | |
|---|---|---|---|---|---|
| DE | 3426738 | A1 | | 1/1986 | |
| DE | 3919458 | A1 | | 12/1990 | |
| DE | 19601230 | A1 | | 7/1997 | |
| DE | 19837248 | A1 | | 2/2000 | |
| DE | 102004060607 | B3 | | 3/2006 | |
| DE | 102007025295 | A1 | | 12/2007 | |
| DE | 102006058322 | A1 | | 6/2008 | |
| DE | 102006037494 | B4 | | 7/2008 | |
| DE | 102007033451 | B4 | | 9/2011 | |
| DE | 102012013872 | A1 | | 2/2012 | |
| DE | 10 2010 051 518 | A1 | | 5/2012 | |
| DE | 202015100627 | U1 | | 6/2015 | |
| DE | 102015002538 | B3 | | 3/2016 | |
| EP | 1344486 | A2 | | 9/2003 | |
| EP | 1460163 | B1 | | 1/2009 | |
| EP | 2154287 | A1 | * | 2/2010 | D06F 37/42 |
| EP | 1 544 387 | B1 | | 12/2010 | |
| EP | 2397626 | A1 | * | 12/2011 | A47L 15/4259 |
| EP | 2 367 997 | B1 | | 5/2013 | |
| EP | 1 975 300 | B1 | | 8/2015 | |
| GB | 2346926 | A | * | 8/2000 | D06F 37/42 |
| JP | 2008-274741 | A | | 11/2008 | |
| KR | 19980031916 | U | * | 8/1998 | D06F 39/14 |
| KR | 20070059434 | A | * | 6/2004 | D06F 58/20 |
| KR | 20110035034 | A | * | 4/2011 | D06F 39/14 |
| KR | 20140064420 | A | | 5/2014 | |
| PL | 361358 | A | | 10/2004 | |
| WO | 02/34994 | A1 | | 5/2002 | |
| WO | 2006/063684 | A1 | | 6/2006 | |
| WO | 2011109235 | A1 | | 9/2011 | |
| WO | 2011132213 | A1 | | 10/2011 | |
| WO | 2013109585 | A2 | | 7/2013 | |
| WO | 2013/150410 | A1 | | 10/2013 | |
| WO | WO-2015189668 | A1 | * | 12/2015 | A47L 15/4259 |
| WO | WO-2017001130 | A1 | * | 1/2017 | E05B 15/1635 |
| WO | 2018236850 | A1 | | 12/2018 | |

* cited by examiner

DOOR LOCK FOR A DOMESTIC ELECTRICAL APPLIANCE

BACKGROUND OF THE INVENTION

1. Field of the Invention

The present invention relates generally to a door lock for a domestic electrical appliance. Particularly, the present invention relates additionally to a domestic electrical appliance that is equipped with such a door lock.

2. Description of the Prior Art

Conventional domestic washing machines of the top loader type have a machine body with an access opening formed on the upper side of the body to a wash drum accommodated in the body. A lid which is pivotable about a horizontal pivot axis is attached to the body, which lid closes the access opening by being folded down and frees the access opening by being lifted up, in order to allow the washing machine to be loaded with laundry or laundry to be removed from the machine.

During washing operation, it is generally required that a user should not be able to open the lid for safety reasons. Hot washing water or hot steam could otherwise escape through the access opening and injure the user. There can also be a risk to the user during a spinning phase of a wash program if he is able to open the lid during spinning, on account of the high speeds which the wash drum can reach when it is spinning.

Conventional door locks for domestic washing machines, including those of the top loader type, are therefore equipped with a locking function which effects locking of the door during washing operation of the washing machine. The locking function prevents the lid (or generally: door) from being able to be opened without force. For this purpose, conventional door locks have a locking member which can be shifted between an unlocking position and a locking position by means of an actuator. In the locking position, the locking member in conventional door locks engages into a closing shackle which, on closing of the door of the washing machine, enters an insertion opening of the door lock. The closing shackle then cannot be moved out of the insertion opening without force. Only when the locking member has been transferred into its unlocking position is the closing shackle free and can be withdrawn from the insertion opening again. With respect to such a form of a door lock for a domestic washing machine of the top loader type, reference is made by way of example to WO 2018/236746 A1.

When mounting the door (lid) on the body of a washing machine, certain mounting tolerances can generally not be excluded. Even in the case of nominally identical attachment of a closing shackle to the door in a group of washing machines, position tolerances of the pivot axis of the door may therefore result in the closing shackle having a different position relative to the body from one machine to another. In addition, tolerances in the attachment of the closing shackle to the door can lead to such position differences. Such tolerances could be taken into account by making an opening of the closing shackle into which the locking member moves on locking sufficiently large so that, even where there are deviations from a nominal position of the closing shackle, the locking member can nevertheless reliably enter the shackle opening. However, this could have the result that, in the locked state, the closing shackle, and thus the door, have a certain degree of play relative to the locking member, which on the one hand can give the user the impression of a loose and thus technically poorly conceived product and may in some circumstances also bring with it safety problems. If, on the other hand, the shackle opening were of such a size that the locking member fits exactly into the opening, even small mounting tolerances could mean that the door cannot be locked because the locking member and the shackle opening are not precisely aligned with one another when the door is closed.

SUMMARY OF THE INVENTION

An object of the invention is to provide a door lock for a domestic electrical appliance which has high functional reliability despite unavoidable mounting tolerances of the domestic appliance.

According to the invention there is provided for achieving this object a door lock for a domestic electrical appliance comprising a lock module and a carrier for mounting the lock module in a floating manner on a superordinate component of the domestic appliance. The lock module has a module housing which has an insertion opening for insertion of a closing element on closing of a door of the domestic appliance. In the module housing there are accommodated a locking member, which is arranged to be movable between an unlocking position and a locking position, and an electrically controllable actuator for actuating the locking member. The locking member in its unlocking position allows the closing element to move out of the insertion opening and in the locking position effects blocking of the closing element against moving out of the insertion opening. At least one centring slope for the closing element is formed at the insertion opening. The floating mounting provided by the carrier for the lock module ensures that the lock module is movable in a floating manner relative to the superordinate component transversely to an insertion direction in which the closing element enters the insertion opening on closing of the door. In the solution according to the invention, the floating mounting of the lock module permits compensating movements of the lock module transversely to the insertion direction of the closing element in order to compensate for any position deviations from a nominal position which the closing element exhibits transversely to the insertion direction. Such compensating movements of the lock module can be initiated by the cooperation of the closing element with the at least one centring slope of the insertion opening.

In some embodiments there is formed at the insertion opening a plurality of centring slopes having a centring action in two centring directions extending transversely to one another, wherein the floating mounting ensures that the lock module is movable in a floating manner in two dimensions relative to the superordinate component in a plane transverse to the insertion direction. These embodiments allow mounting tolerances in any direction within a plane oriented transversely to the insertion direction to be compensated.

In some embodiments, the floating mounting creates play of the lock module relative to the superordinate component by at least 2 mm or at least 3 mm in at least one movement direction extending transversely to the insertion direction.

In some embodiments, the carrier has a housing component, separate from the module housing, having a receiving space into which the lock module is inserted in a floating manner relative to the housing component.

In some embodiments, the lock module is mounted on the housing component in a loss-proof manner.

In some embodiments, the housing component has mounting structures for the stationary mounting of the housing component on the superordinate component. For example, for the purpose of mounting the housing component on the superordinate component, the carrier can further comprise a plate element, separate from the housing component, which serves as a counter-support for the sandwich-like clamping of a wall portion of the superordinate component, which plate element can be connected to the housing component via a plug connection, for example.

In some embodiments, the housing component has a through-opening through which the closing element passes on closing of the door, before the closing element enters the insertion opening of the lock module.

In some embodiments, the housing component has a clamping holder for an electrical connection cable which can be connected to a socket of the lock module.

In some embodiments, the lock module is received in the receiving space of the housing component with a friction fit secured against floating movements caused by gravity. This friction fit ensures that the lock module does not move into the receiving space under the effect of only slight vibrations but that the lock module—after it has once been set in a specific position relative to the housing component by closing of the door of the domestic appliance—retains that position as long as the user does not displace the lock module within the housing component again by external action.

The superordinate component is either the door of the domestic appliance or the body thereof, which can also be referred to as the appliance main body. In some embodiments, the closing element is arranged on the door while the lock module with the carrier is arranged on the appliance main body.

In some embodiments, the domestic appliance is a domestic washing machine of the top loader type, wherein the invention is applicable equally to washing machines of the front loader type which have a door which is pivotably attached to a front side of the machine body and conventionally provided with a bull's eye. The use of the invention in other types of domestic appliance is also conceivable, for example in tumble dryers or so-called washer-dryers (i.e. appliances which have a combined washing and drying function for laundry) or in domestic ovens or microwave ovens.

The invention further provides a domestic electrical appliance which comprises an appliance main body having a working chamber formed therein, which working chamber is accessible through an access opening, a door pivotably mounted on the appliance main body for closing the access opening, and a door lock which can be configured in the manner discussed hereinbefore. The door lock comprises a lock module having a module housing, wherein the module housing has an insertion opening for insertion of a closing element on closing of the door of the domestic appliance, and there are accommodated in the module housing a locking member which is arranged to be movable between an unlocking position and a locking position, and an electrically controllable actuator for actuating the locking member. The locking member in its unlocking position allows the closing element to move out of the insertion opening and in the locking position effects blocking of the closing element against moving out of the insertion opening. The closing element is arranged on one of the appliance main body and the door, while the lock module is arranged on the other of the appliance main body and the door. The lock module is movable in a floating manner relative to the other of the appliance main body and the door transversely to an insertion direction in which the closing element enters the insertion opening on closing of the door.

The invention will be explained further hereinbelow with reference to the accompanying drawings.

DETAILED DESCRIPTION OF THE INVENTION

Figure 1:
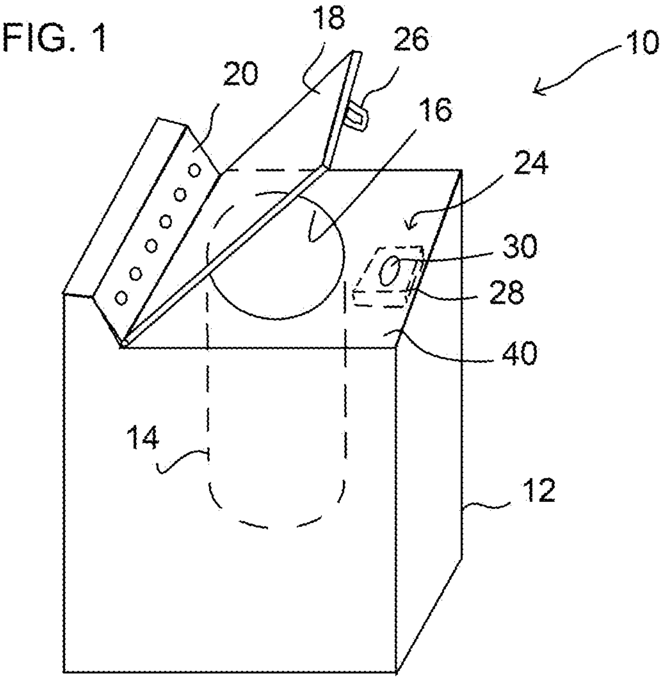
FIG. 1 is a perspective view, in schematic form, of a domestic washing machine according to an exemplary embodiment.

Reference will first be made to FIG. 1. The domestic washing machine shown therein, designated generally 10, is of the top loader type in the example shown and comprises a machine body (machine main body) 12, in which a liquor container 14, shown by broken lines, is accommodated. In the liquor container 14, a wash drum (not shown) is rotatably mounted about a vertical axis of rotation in a manner known per se; the wash drum forms a working chamber (wash chamber) of the washing machine 10. This wash chamber is accessible through an access opening 16 formed on the upper side of the machine body. A lid 18 mounted on the machine body 12 to be pivotable about a horizontal pivot axis can be pivoted upwards in order to free the access opening 16 and allow the user to insert and remove laundry, and can be folded downwards so that the lid 18 lies horizontally on the machine body 12 and blocks the access opening 16. On an operating panel 20 of the machine body 12 there are various operating elements and display elements which serve for the user as a control interface of the washing machine and allow the user to set different wash programs, for example.

The lid 18 forms a door within the meaning of the present disclosure. It will be appreciated that the invention is not limited to washing machines of the top loader type; instead, it can equally be used, for example, in domestic washing machines of the front loader type, which conventionally have a bull's eye door which is pivotable about a vertical pivot axis. Hereinbelow, the lid 18 will nevertheless continue to be referred to as a lid (instead of as a door).

For holding the lid 18 closed, that is to say when it has been folded down onto the machine body 12, there serves a door lock, designated generally 24, which comprises as two fundamental components a closing element 26 and a lock assembly 28. The closing element 26 and the lock assembly 28 cooperate on closing of the lid 18 in that the closing element 26 enters an insertion orifice 30 of the lock assembly 28 and can be secured by the lock assembly 28 in a manner which will be explained in greater detail hereinbelow against being lifted out of the insertion orifice 30. In the example shown, the closing element 26 is mounted on the lid 18; the lock assembly 28, on the other hand, is attached to the machine body 12. It will be appreciated that the pattern of arrangement of the closing element 26 and the lock assembly 28 can be reversed, that is to say the closing element 26 can in other embodiments be mounted on the machine body 12 and the lock assembly 28 can be attached to the lid 18.

Figure 2A:
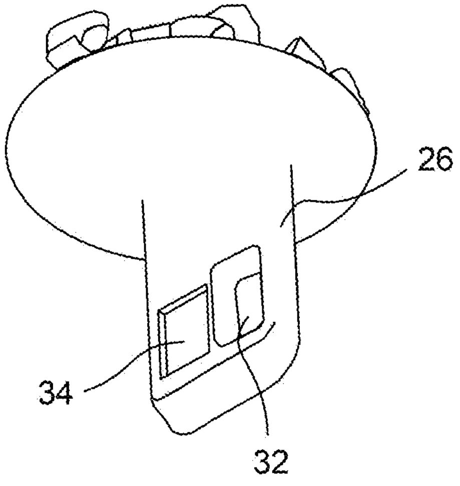
FIGS. 2*a* and 2*b* are a perspective view of and a section through, respectively, a closing element according to an exemplary embodiment.
Figure 2B:
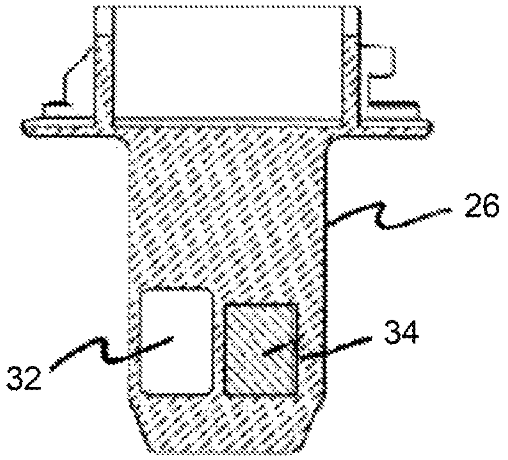
Figure 3:
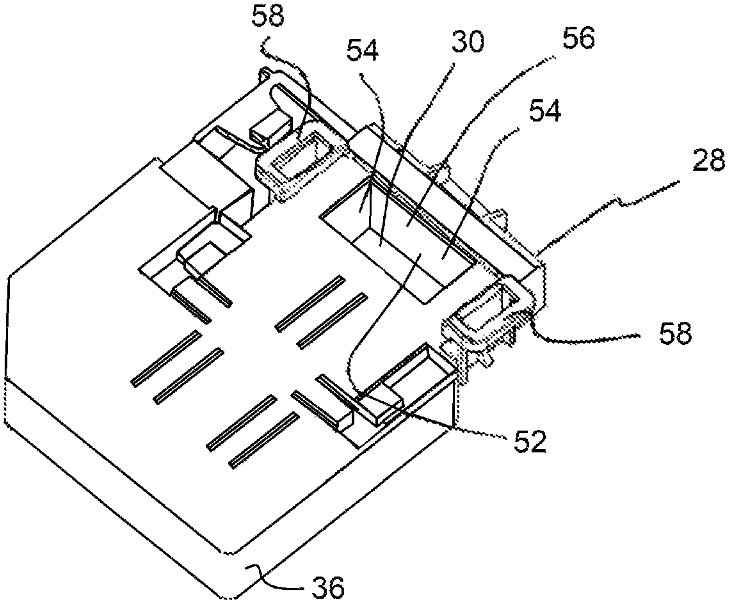
FIG. 3 is a perspective view of a lock assembly according to an exemplary embodiment.

Reference will now additionally be made to FIGS. 2*a*, 2*b*. In the case shown, the closing element 26 has a recess 32 in the form of an opening, into which a locking slider (not shown separately in FIG. 1) contained in the lock assembly 28 is able to engage for the purpose of locking the lid 18. As long as the locking slider is not engaged in the recess 32 of the closing element 26, the lid 18 can be opened again by the user at any time. The start of a wash program, in particular the admission of water into the liquor container 14, is possible in the case of the machine 10 only once the locking slider has engaged in the recess 32 of the closing element 26 and the lid 18 is correspondingly locked.

In addition to the recess 32, the closing element 26 in the example shown is equipped with a permanent magnet 34 which cooperates with a magnetically controllable electrical on/off switch (also not shown separately in FIG. 1) contained in the lock assembly 28. This electrical switch, referred to for the sake of simplicity as a door switch, serves as a detection means for detecting the closed state of the lid 18. Typically, the door switch changes from an open switching status to a closed switching status on closing of the lid 18.

Reference will now additionally be made to FIGS. 3, 4*a*, 4*b* and 4*c*. The lock assembly 28 comprises multiple housing components, of which an outer housing shell 36 serves for mounting on a housing wall portion 38 of an upper housing wall 40 (FIG. 1) of the machine body 12. The housing shell 36 forms a receiving space 42 in which a lock module 44, which is in itself mechanically fully functional, is received. The lock module 44 is received in the receiving space 42 of the housing shell 36 in a floating manner in an x-y plane (FIG. 4*a*) both in the x-direction and in the y-direction, that is to say the lock module 44 has play relative to the housing shell 36—which is stationarily fastened to the housing wall portion 38.

The lock module 44 has a module housing 46, which in the example shown is in two parts, having a housing cover 48 and a housing bottom part 50. Inside the module housing 46 there are accommodated various mechanical, electrical and electromechanical components which perform the mechanical and electrical function of the lock assembly 28. The module housing 46 forms an insertion opening 52, which is part of the insertion orifice 30 of the lock assembly 28.

At the insertion opening 52 of the lock module 46 there are formed multiple centring slopes 54 which are arranged around the insertion opening 52 in a rectangular arrangement and have a centring action for the closing element 26 when it enters the insertion opening 52 and strikes one or more of the centring slopes 54. It can be said that the centring slopes 54 (insertion slopes) form a type of centring funnel. The centring action involves a compensating movement of the lock module 44 in the x-y plane relative to the housing shell 36; in some embodiments, the closing element 26 itself is in any case attached to the lid 18 in a stationary manner and is not capable of performing compensating movements relative to the lid 18. The degree of play of the lock module 44 in the housing shell 36 is at least 3 mm in each of the x- and y-directions.

In the housing shell 36 there is provided a fully framed through-opening 56 which is likewise part of the insertion orifice 30 of the lock assembly 28 and is sufficiently large to ensure that the closing element 26 passes reliably through the through-opening 56 on closing of the lid 18 regardless of any mounting tolerances of the closing element 26. On closing of the lid 18, the closing element 26 first enters the through-opening 56 before it enters the insertion opening 52.

On the housing shell 36 there are formed multiple (in the example shown two) mounting eyes 58, which serve for mounting of the housing shell 36 on the housing wall portion 38. The housing shell 36 is mounted on the housing wall portion 38 by means of a plate element 60 (FIGS. 4*b*, 4*c*) which serves as a counter-support. For this purpose, the housing shell 36 is placed against the housing wall portion 38 from one wall side, and the plate element 60 is brought up to the wall portion 38 from the opposite wall side. Latching tabs 62 (FIG. 42) are formed on the plate element 60, which latching tabs can each be inserted into one of the mounting eyes 58 of the housing shell 36 and can be locked therein. The housing wall portion 38 is in this manner clamped in the manner of a sandwich between the housing shell 36 and the counter-support plate element 60; the housing shell 36 is consequently fastened in a stationary manner to the housing wall portion 38.

Figure 4A:
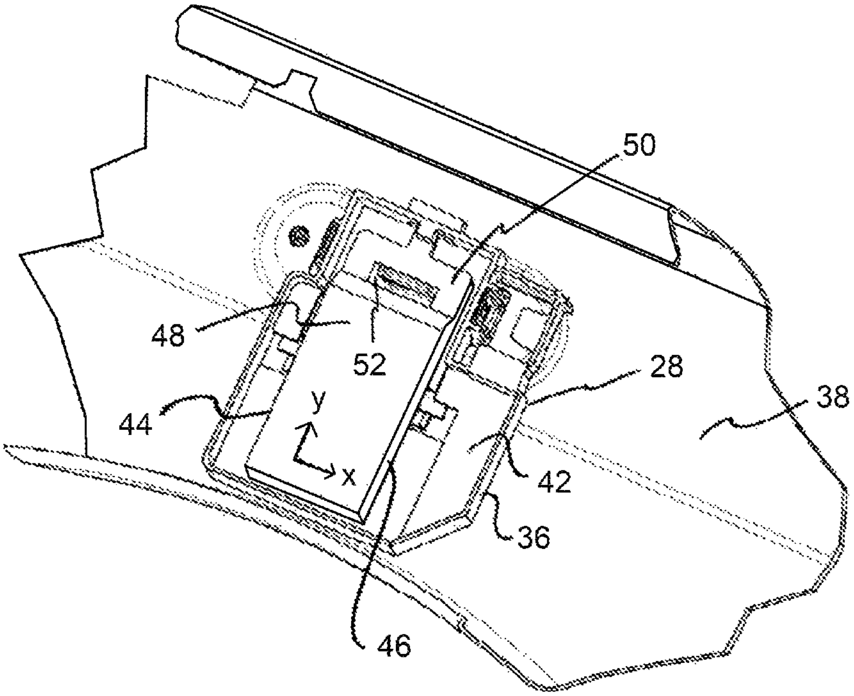
FIG. 4*a* is a view of the lock assembly of FIG. 3 when arranged on a housing wall portion of a machine body of the washing machine of FIG. 1.
Figure 4B:
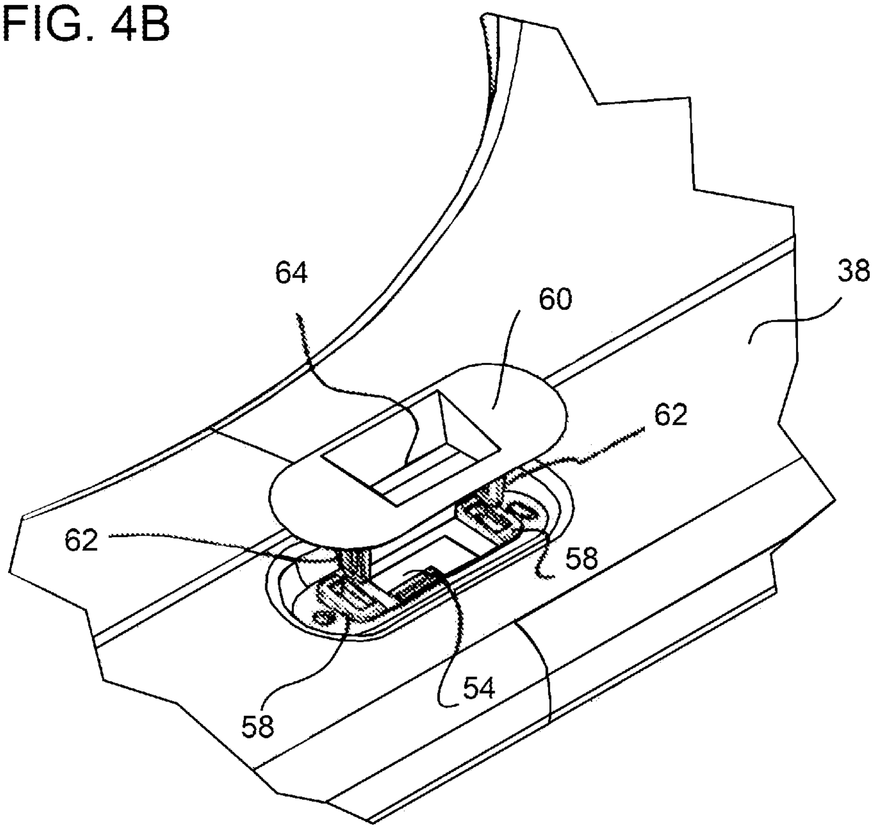
FIG. 4*b* is a view from outside the machine body of the housing wall portion of FIG. 4*a* to illustrate the manner in which a counter-support plate element is to be connected to the lock assembly of FIG. 3.
Figure 4C:
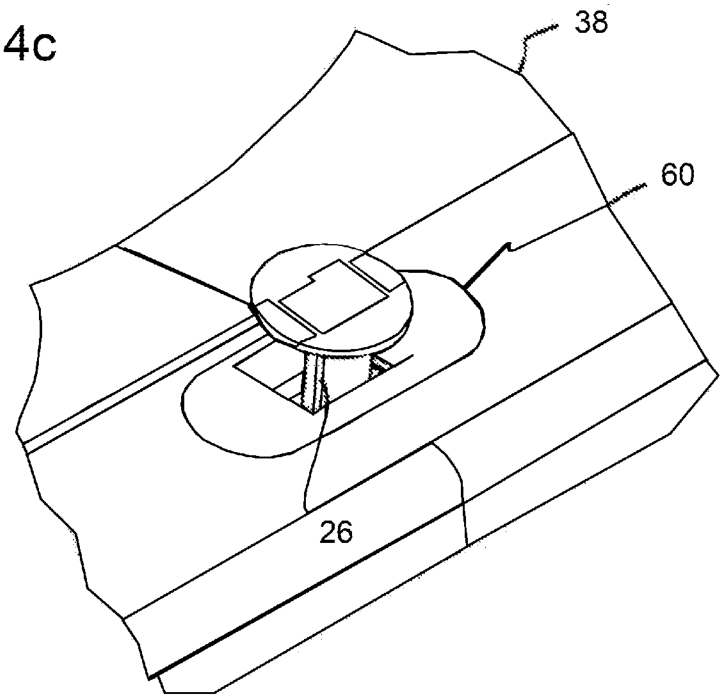
FIG. 4*c* is a view corresponding to FIG. 4*b* in a state in which the counter-support plate element is finally mounted and the closing element of FIG. 2*a*, 2*b* is partially inserted into an insertion funnel of the counter-support plate element.

The counter-support plate element 60 also has a through-opening 64 for the closing element 26. It will be appreciated that the housing wall portion 38 also has a wall opening of a sufficient size in the region of the through-openings 56, 64, so that, on closing of the lid 18, the closing element 26 enters the through-opening 64 of the counter-support plate element 60, then the wall opening of the housing wall portion 38, then the through-opening 56 of the housing shell 36 and finally the insertion opening 52 of the lock module 44. FIG. 4*c* shows the closing element 26 in the state of entering the counter-support plate element 60. The counter-support plate element 60, together with the housing shell 36, forms a carrier for holding the lock module 44 with play on a superordinate component (here: the machine body 12).

Figure 5A:
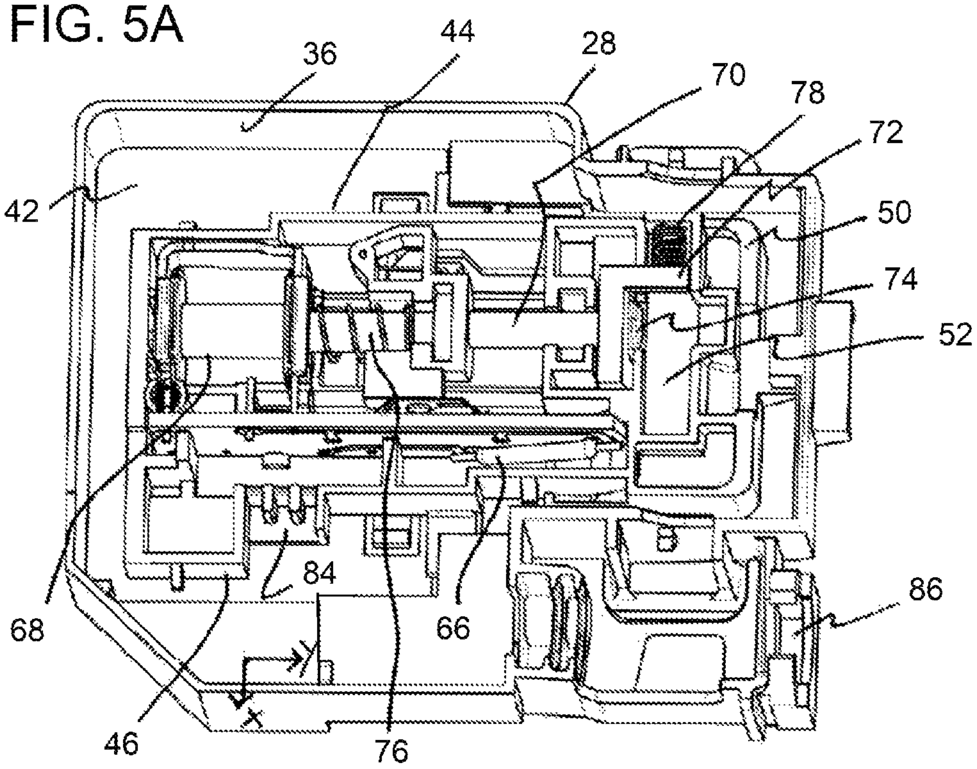
FIG. 5*a* is a plan view of an underside of the lock assembly in a situation in which a housing cover of a module housing of a lock module of the lock assembly has been removed and a locking slider of the lock module is in an unlocking position.
Figure 5B:
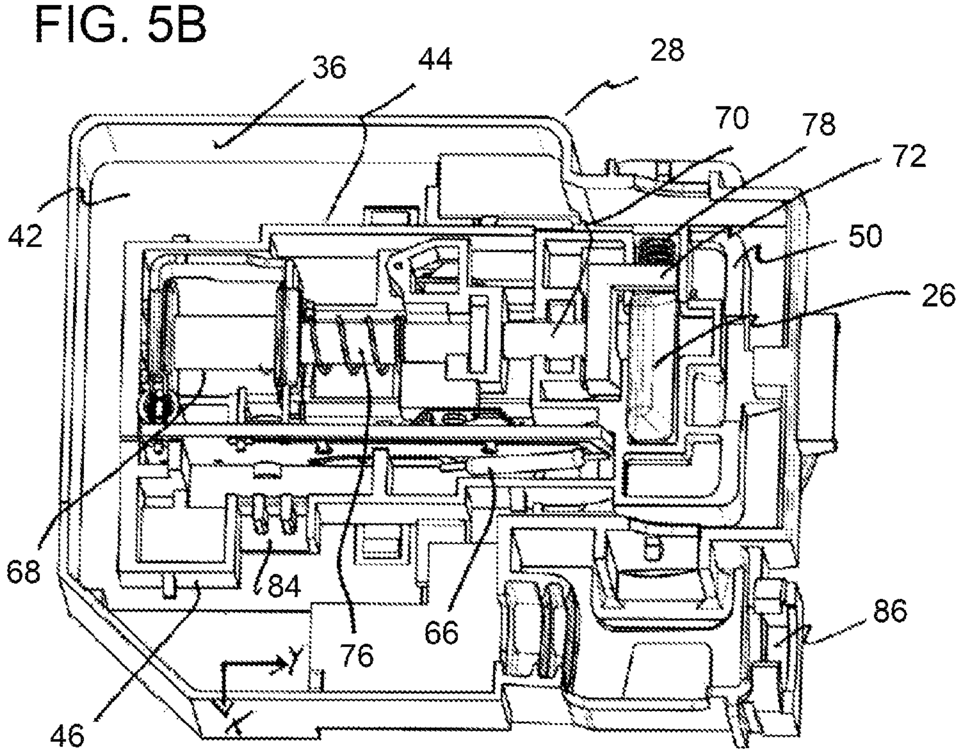
FIG. 5*b* is a view corresponding to FIG. 5*a* in a situation in which the locking slider is in a locking position.

For a more detailed explanation of the construction of the lock module 44, reference will now additionally be made to FIGS. 5*a*, 5*b*. In the representations of these figures, the housing cover 48 of the module housing 46 of the lock module 44 has been omitted. The lock module 44 comprises—accommodated in the module housing 46—an electrical door switch 66, an electromagnetic actuator 68, a locking slider 70 and an auxiliary slider 72. The door switch 66 responds to the closing of the lid 18 and, by its switching status, signals to an electrical control unit, not shown in greater detail, of the washing machine 10 whether the lid 18 is closed or not. In the example shown, the door switch 66 is formed by a reed switch and is controlled by the magnet 34 of the closing element 26. On closing of the lid 18, the magnet 34 enters the insertion orifice 30 of the lock assembly 28, whereby the reed switch 66 moves into the magnetic field of the magnet 34. The influence of the magnetic field of the magnet 34 causes a change in the switching status of the reed switch 66.

The locking slider 70 is in the form of a linear slider which is movably guided in the module housing 46 in a linear sliding direction. The sliding direction of the locking slider 70 in the example shown is the y-direction and is approximately perpendicular to the direction in which the closing element 26 enters the insertion orifice 30 on closing of the lid 18. Although the closing element 26 follows a circular path on closing of the lid 18, at the point at which the closing element 26 enters the lock assembly 28 the associated track portion of the circular path can be understood in good approximation as being a straight line, wherein this straight line is oriented substantially perpendicularly to the sliding direction of the locking slider 70. The locking slider 70 has a leading locking tip 74 which is intended to engage in the recess 32 of the closing element 26.

The electromagnetic actuator 68 serves to actuate the locking slider 70. The locking slider 70 is coupled for movement with an armature 76 of the electromagnetic actuator 68 so that, when current is fed to the electromagnetic actuator 68, the locking slider 70 moves together with the armature 76. The electromagnetic actuator 68 is electrically controlled by an electrical control unit, not shown in greater detail in the drawings, of the washing machine 10. In particular, the control unit is so adapted that a current feed pulse is not applied to the electromagnetic actuator 68 until the door switch 66 has signalled that the lid 18 is closed.

FIG. 5*a* shows the locking slider 70 in an unlocking position, in which it has moved out of the entry path of the closing element 26 into the insertion opening 52. In FIG. 5*b*, on the other hand, the locking slider 70 has been advanced into a locking position in which it projects into the insertion opening 52 and—if the lid 18 has been closed properly and the closing element 26 has entered the insertion opening 52—engages in the recess 32 of the closing element 26. The closing element 26 is thereby blocked against leaving the insertion opening 52; the lid 18 cannot be opened by the user without force.

The function of the auxiliary slider 72 is to prevent a movement of the locking slider 70 out of the unlocking position into the locking position when the lid 18 is open, that is to say as long as the closing element 26 has not entered the insertion opening 52. On closing of the lid 18, the auxiliary slider 72 is urged by the closing element 26, by physical contact, against the action of a return spring 78, out of a blocking position, in which the auxiliary slider 72 blocks the locking slider 70, into a release position in which blocking of the auxiliary slider 70 by the auxiliary slider 72 is removed. In FIG. 5*a*, the auxiliary slider 72 is shown in its blocking position, in FIG. 5*b* it is shown in its release position.

Figure 6A:
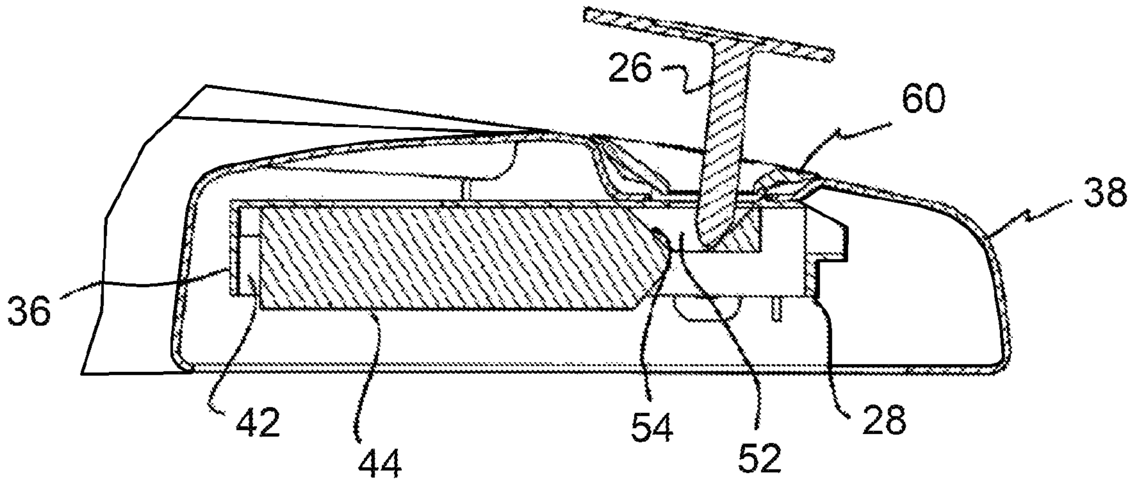
FIGS. 6*a*, 6*b* and 6*c* are sectional views of the closing element of FIGS. 2*a*, 2*b* and of the lock assembly of FIG. 3 in different situations to illustrate the movability in a floating manner of the lock module relative to the housing wall portion of the machine body.
Figure 6B:
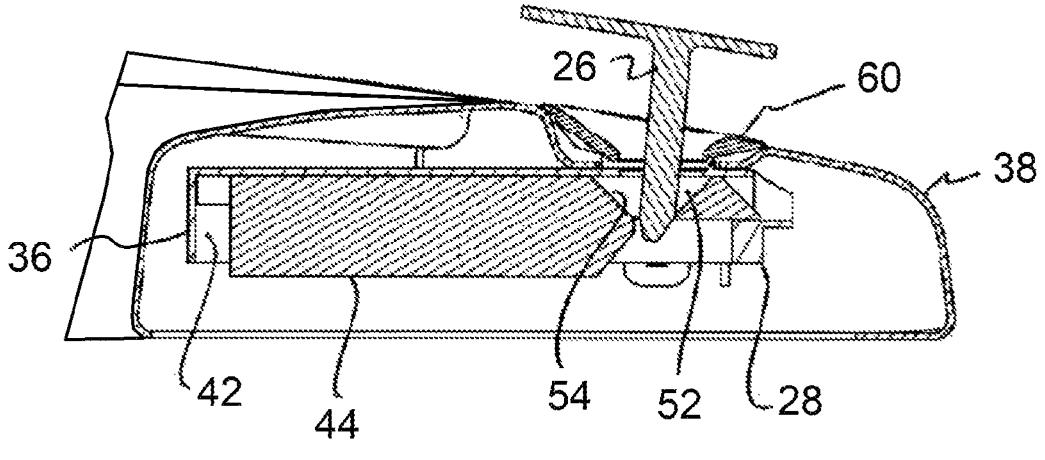
Figure 6C:
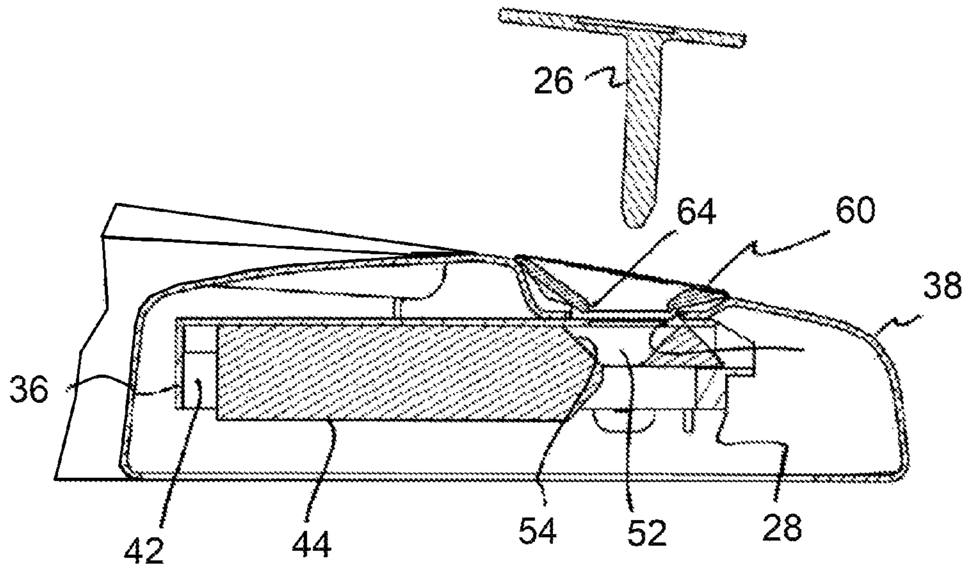

Reference will now be made to FIGS. 6*a* to 6*c*. FIG. 6*a* shows a situation in which the closing element 26, on closing of the lid 18, enters the insertion opening 52 and thereby strikes one of the centring slopes 54 of the lock module 44. This results in a compensating movement of the lock module 44 to the right, until the relative position of the lock module 44 with respect to the housing shell 36 shown in FIG. 6*b* is reached. In this situation, the closing element 26 can enter the insertion opening 52 sufficiently deeply that the locking slider 70 can be moved out of the unlocking position according to FIG. 5*a* into the locking position according to FIG. 5*b*.

After the lid 18 has been opened, that is to say after the closing element 26 has moved out of the insertion opening 52, the lock module 44 remains in its centred position relative to the housing shell 36, as illustrated in FIG. 6*c*. The lock module 44 remains in the centred position as a result of a friction fit with which the lock module 44 is received in the receiving space 42 of the housing shell 36. The lock module 44 is accordingly not received in the housing shell 36 in a loosely movable manner but is in frictional engagement with the housing shell 36, wherein this frictional engagement does not stand in the way of a centring compensating movement of the lock module 44 on closing of the lid 18 but prevents unintentional displacement of the lock module 44 within the receiving space 42, for example as a result of vibrations of the machine body 12.

Figure 7:
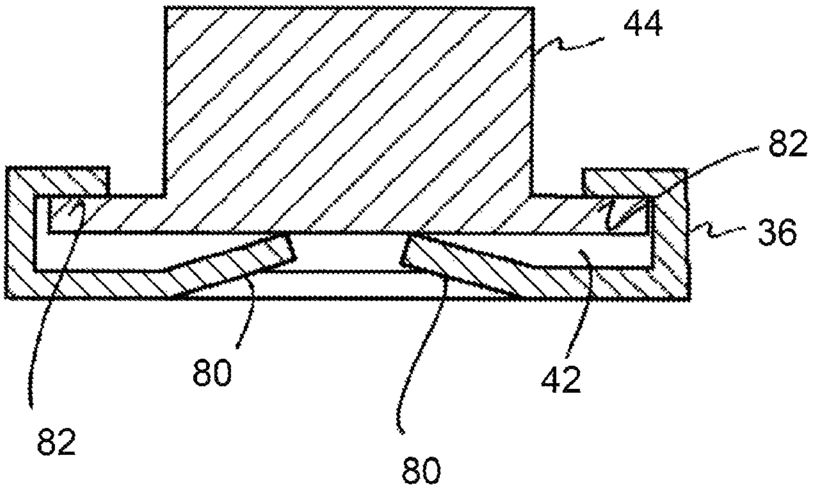
FIG. 7 is a schematic representation to illustrate the realisation of a slidable friction fit of the lock module in an outer housing of the lock assembly of FIG. 3.

For a more detailed explanation of the friction fit, reference will now additionally be made to FIG. 7, which illustrates, in schematic form, the receiving principle of the lock module 44 in the housing shell 36. According to this receiving principle, one or more resilient tabs 80 are formed on the housing shell 36, which resilient tabs press against the lock module 44 and press it against abutment surfaces 82 of the housing shell 36. The biasing force exerted by the resilient tabs 80 is—as explained—sufficiently great to prevent unintentional displacement of the lock module 44 in the receiving space 42 as a result of gravity and/or as a result of the action of vibrations. By being received in the receiving space 42 in this manner, the lock module 44 is also mounted in a loss-proof manner on the housing shell 36. Even in the situation according to FIG. 3, in which the housing shell 36 is open at the bottom (this corresponds to the installation position of the housing shell 36, see FIGS. 6*a* to 6*c*), the lock module 44 can therefore not fall downwards out of the housing shell 36. Instead, it is held on the housing shell 36.

Referring again to FIGS. 5*a*, 5*b*, a socket 84 is formed on the lock module 44, to which a connector of an electrical connection cable (not shown) can be fitted. The housing shell 36 is designed with a clamping holder 86 into which the connection cable can be placed in order to clamp the cable in the clamping holder 86. The clamping holder 86 can in particular have a strain-relief function for the connection cable.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A door lock for a domestic electrical appliance, comprising:

a lock module having a module housing, wherein the module housing has an insertion opening for insertion of a closing element on closing of a door of the domestic appliance and there are accommodated in the module housing a locking member, which is arranged to be movable relative to the module housing between an unlocking position and a locking position, and an electrically controllable actuator for actuating the locking member, wherein the locking member in its unlocking position allows the closing element to move out of the insertion opening and in the locking position effects blocking of the closing element against moving out of the insertion opening, wherein in being accommodated in the module housing the electrically controllable actuator is substantially enclosed within the module housing, wherein the locking member in its locking position is configured to directly engage the closing element, and wherein there is formed at the insertion opening at least one centering slope for the closing element; and a carrier for a floating mounting of the lock module on a superordinate component of the domestic appliance, wherein the floating mounting ensures that the lock module is movable in a floating manner relative to the superordinate component transversely to an insertion direction in which the closing element enters the insertion opening on closing of the door so as to permit compensating movements of the module housing transversely to the insertion direction of the closing element in order to compensate for any position deviations from a nominal position which the closing element exhibits transversely to the insertion direction.

2. The door lock according to claim 1, wherein there is formed at the insertion opening a plurality of centering slopes having a centering action in two centering directions extending transversely to one another, wherein the floating mounting ensures that the lock module is movable in a floating manner in two dimensions relative to the superordinate component in a plane transverse to the insertion direction.

3. The door lock according to claim 1, wherein the floating mounting permits play of the lock module relative to superordinate component by at least 2 mm or at least 3 mm in at least one movement direction extending transversely to the insertion direction.

4. The door lock according to claim 1, wherein the carrier has a housing component, separate from the module housing, having a receiving space, into which the lock module is inserted in a floating manner relative to the housing component.

5. The door lock according to claim 4, wherein the lock module is mounted on the housing component in a loss-proof manner so as to prevent accidental disassembly.

6. The door lock according to claim 4, wherein the housing component has mounting structures for the stationary mounting of the housing component on the superordinate component.

7. The door lock according to claim 4, wherein the carrier further comprises a plate element, separate from the housing component, which serves as a counter-support for the sandwich clamping of a wall portion of the superordinate component, which plate element can be connected to the housing component by a plug connection.

8. The door lock according to claim 4, wherein the housing component has a through-opening through which the closing element passes on closing of the door, before the closing element enters the insertion opening of the lock module.

9. The door lock according to claim 4, wherein the housing component has a clamping holder for an electrical connection cable which can be connected to a socket of the lock module.

10. The door lock according to claim 4 wherein the lock module is received in the receiving space with a friction fit secured against floating movements caused by gravity.

11. A domestic electrical appliance, comprising:

an appliance main body having a working chamber formed therein, which working chamber is accessible through an access opening;

a door pivotably mounted on the appliance main body for closing the access opening; and a door lock, wherein the door lock comprises a lock module having a module housing, wherein the module housing has an insertion opening for insertion of a closing element on closing of the door of the domestic appliance, and there are accommodated in the module housing a locking member which is arranged to be movable relative to the module housing between an unlocking position and a locking position, and an electrically controllable actuator for actuating the locking member, wherein the locking member in its unlocking position allows the closing element to move out of the insertion opening and in the locking position effects blocking of the closing element against moving out of the insertion opening, wherein in being accommodated in the module housing the electrically controllable actuator is substantially enclosed within the module housing, wherein the locking members in its locking position is configured to directly engage the closing element;

wherein the closing element is arranged on one of the appliance main body and the door and the lock module is arranged on the other of the appliance main body and the door, and wherein the lock module is movable in a floating manner relative to the other of the appliance main body and the door transversely to an insertion direction in which the closing element enters the insertion opening on closing of the door so as to permit compensating movements of the module housing transversely to the insertion direction of the closing element in order to compensate for any position deviations from a nominal position which the closing element exhibits transversely to the insertion direction.

* * * * *